No. 624,064. Patented May 2, 1899.
L. J. MILLER & W. McDONOUGH.
VEHICLE BRAKE.
(Application filed Aug. 3, 1898.)
(No Model.)
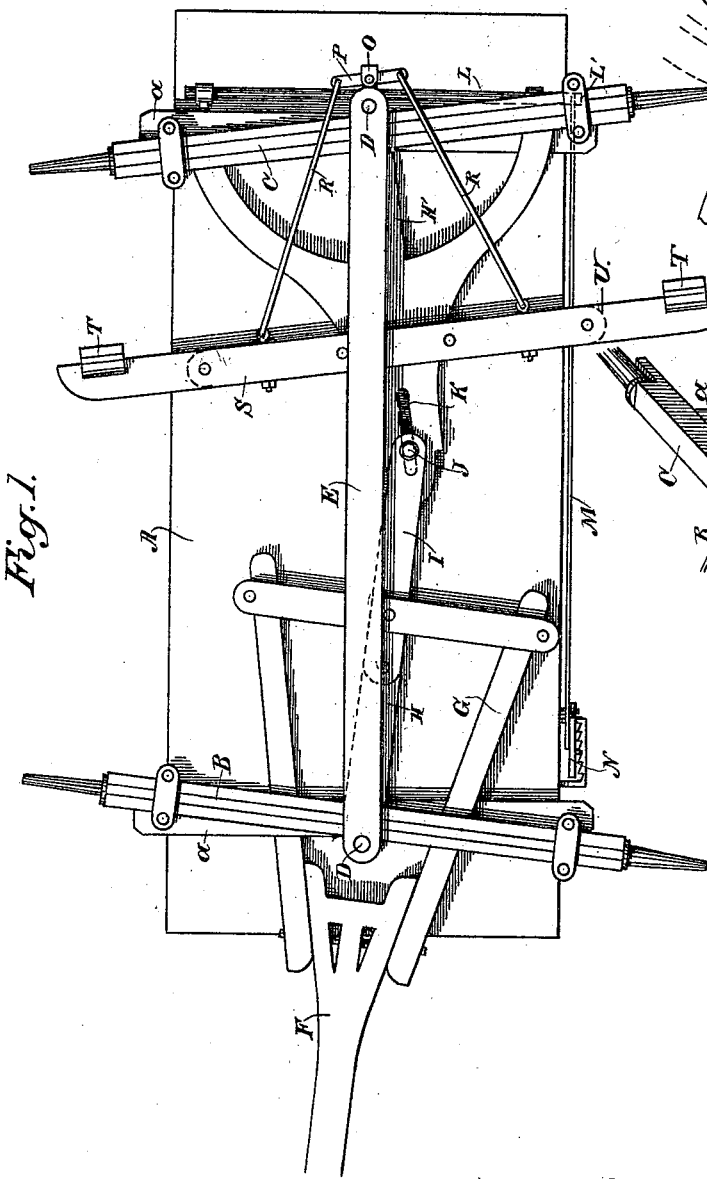
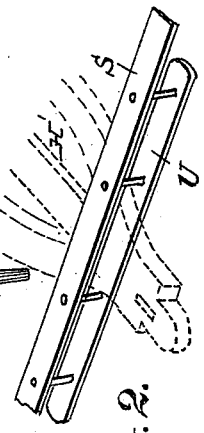
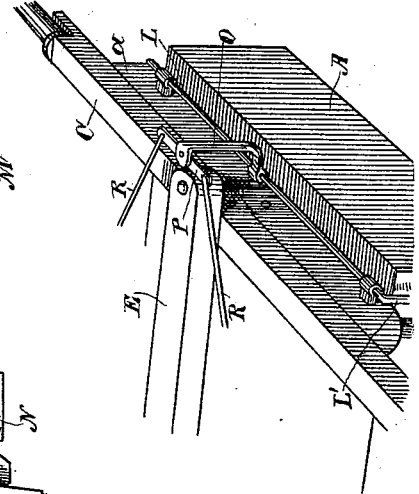
Witnesses,
Inventors,
Leah J. Miller
William McDonough
By Dewey Strong & Co.
Attys
THE NORRIS PETERS CO., PHOTO-LITHO., WASHINGTON, D. C.

UNITED STATES PATENT OFFICE.

LEAH J. MILLER AND WILLIAM McDONOUGH, OF FERNDALE, CALIFORNIA.

VEHICLE-BRAKE.

SPECIFICATION forming part of Letters Patent No. 624,064, dated May 2, 1899.

Application filed August 3, 1898. Serial No. 687,597. (No model.)

*To all whom it may concern:*

Be it known that we, LEAH J. MILLER and WILLIAM McDONOUGH, citizens of the United States, residing at Ferndale, county of Humboldt, State of California, have invented an Improvement in Vehicles; and we hereby declare the following to be a full, clear, and exact description of the same.

Our invention relates to certain improvements in the construction of wagons, carriages, and similar vehicles; and it consists, essentially, in the pivoting of both front and rear axles so that they are turnable about their independent pivots or king-bolts, and in combination therewith of a reach formed in two sections and so united that the turning of one pair of wheels in one direction will turn the other pair equally in the opposite direction, so that the wagon will turn in a small circle and the front and hind wheels will track while making the turn.

In combination with this device is a brake adapted to act upon the rear pair of wheels and a mechanism connecting the brake with the actuating-lever at the front, so that the brake may be applied to the wheels at whatever angle they may stand with relation to the wagon-body.

The invention also comprises details of construction which will be more fully explained by reference to the accompanying drawings, in which—

Figure 1 is a bottom view of the vehicle. Fig. 2 is a detail bottom view of the brake connections. Fig. 3 is a detail showing the transverse bar U.

In the construction of wagons and vehicles which are to be used upon narrow, rough, and mountain roads and where short turns are to be made it is desirable to so construct the wagon that it can be turned in a very short space, and on many roads where the track is exceedingly narrow and dangerous it is necessary that the hind wheels should follow exactly in the track of the front wheels while making a turn, and this is especially necessary where two or more wagons are coupled together to be hauled by a single team. It is well known that where the front axle only is pivoted and turnable upon its king-bolt the rear wheels do not follow in the track of the front wheels when a turn is made, and this difficulty increases in the coupling of two or more wagons. Our invention is designed to overcome this difficulty and also to provide a means by which brakes can be efficiently applied to the vehicles while allowing the rear axle and its wheels to be turned in unison with the turning of the front axle.

A is a wagon-body which for illustration is simply represented as an ordinary rectangular box. Beneath this box are fixed bolsters *a a*, to which are pivoted the front and rear axles B and C by means of king-bolts D; and in order to stiffen and strengthen the connection these king-bolts pass through a rigid reach E, which extends centrally beneath the axles from one to the other.

F is the tongue of the vehicle, G the hounds, and H is an extension rearwardly from the front axle, with which and the hounds it is rigidly connected. H' is a similar extension forward from the rear axle, with which it is also rigidly connected, and these two independent reaches or extensions approach closely together when the wheels are in a straight line.

I I are links fixed to one of the reaches and having a pin J, which is movable in a slot K, made in the other reach. This construction allows the two to turn with relation to each other and to extend themselves as much as the turning requires. It will be seen that by this connection when one pair of the wheels is turned in one direction the other pair will be correspondingly turned in the opposite direction, so that the two inner wheels on the curve will be close together and the two outer wheels correspondingly separated. This insures the hind wheels following exactly in the track of the front wheels and turning in a very short curve.

In order to use a brake upon a vehicle of this construction, which is indispensable, we have shown the horizontal rock-shaft L, journaled upon the rear bolster, as shown, having an upturned lever-arm L' at one side, and this lever-arm is connected by a rod M with the regular brake-lever N at the front of the wagon, within reach of the driver and operated in the usual manner. The shaft L has a central arm O extending downwardly and close to the rear king-bolt. Across the lower end of this arm is a pivoted yoke P, and from this yoke rods R extend forwardly, diverging from each other, as shown, and are connected with the brake-beam S. This brake-beam carries the brake-shoes T upon its outer ends and is suspended from a transverse bar U, which is fixed across the rear reach H' and the connecting hounds or braces, so that it lies parallel with the rear axle, and it and the brake-beam are turnable in unison therewith. The yoke P being turnable in the lower end of the lever O and being connected with the brake-beam, as shown, it will be seen that these parts are allowed to turn in unison with the movement of the rear-wheel axle about its king-bolt, while the shaft L remains parallel with the bolster and the non-turnable portions of the vehicle.

By this construction it is possible to perfectly control the wagon and to apply the brake to the wheels whatever may be the angle at which they stand with the vehicle, and where two or more wagons are connected they can be made to follow each other accurately in turning sharp corners and on narrow roads.

Having thus described our invention, what we claim as new, and desire to secure by Letters Patent, is—

1. A vehicle having a jointed reach and independently pivoted, front and rear axles connected and turnable in unison by said reach, a brake-beam suspended from the rear portion of the reach and carrying shoes upon its outer end adapted to press upon the rear wheels, a shaft journaled upon the non-turnable rear bolster having a central arm close to the rear king-bolt, connections from said arm to the brake-beam, and connections between the shaft and the front brake-lever, substantially as described.

2. A vehicle having front and rear bolsters and axles turnable upon central king-bolts, a jointed reach, one section of which is rigidly connected with each of the axles whereby they are turnable in unison in opposite directions, a rock-shaft journaled upon the fixed rear bolster and having its arm connected with the front brake-lever, a central arm extending downwardly from said rock-shaft in proximity with the rear king-bolt, a yoke fulcrumed transversely and turnable in the lower end of said arm, a brake-beam carried by the rear portion of the jointed reach with shoes adapted to press against the rear wheels and divergent rods connecting the turnable yoke with the brake-beam substantially as described.

In witness whereof we have hereunto set our hands.

LEAH J. MILLER.
    WILLIAM McDONOUGH.

Witnesses for Leah J. Miller:
 JESSIE C. BRODIE,
 S. H. NOURSE.

Witnesses for William McDonough:
 F. N. RASMUSSEN,
 O. E. MERRILL.